US012655922B2

(12) United States Patent
Han et al.

(10) Patent No.: US 12,655,922 B2
(45) Date of Patent: Jun. 16, 2026

(54) SPIGOT ASSEMBLY FOR A RECHARGEABLE BATTERY THERMAL MANAGEMENT SYSTEM AND A VEHICLE HAVING SAME

(71) Applicant: GM GLOBAL TECHNOLOGY OPERATIONS LLC, Detroit, MI (US)

(72) Inventors: Su Jung Han, West Bloomfield, MI (US); Erich Gernand, Flint, MI (US); Jared C. Harper, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 623 days.

(21) Appl. No.: 18/316,346

(22) Filed: May 12, 2023

(65) Prior Publication Data

US 2024/0380024 A1 Nov. 14, 2024

(51) Int. Cl.
| | |
|---|---|
| *F16L 21/02* | (2006.01) |
| *B60R 16/033* | (2006.01) |
| *F16L 21/03* | (2006.01) |
| *H01M 10/0525* | (2010.01) |
| *H01M 10/613* | (2014.01) |
| *H01M 10/625* | (2014.01) |
| *H01M 10/6556* | (2014.01) |
| *H01M 10/6568* | (2014.01) |

(52) U.S. Cl.
CPC ........... *F16L 21/02* (2013.01); *B60R 16/033* (2013.01); *F16L 21/03* (2013.01); *H01M 10/0525* (2013.01); *H01M 10/613* (2015.04); *H01M 10/625* (2015.04); *H01M 10/6556* (2015.04); *H01M 10/6568* (2015.04); *H01M 2220/20* (2013.01)

(58) Field of Classification Search
CPC ......... F16L 21/02; F16L 21/03; F16L 21/035; H01M 10/6568; H01M 10/613; H01M 10/6556
USPC .................................................. 285/351, 375
See application file for complete search history.

(56) References Cited

U.S. PATENT DOCUMENTS

| | | | | | |
|---|---|---|---|---|---|
| 5,647,612 A | * | 7/1997 | Yoshida | ................... | F16L 21/06 |
| | | | | | 285/365 |
| 6,409,175 B1 | * | 6/2002 | Evans | ................... | F16L 15/003 |
| | | | | | 29/523 |
| 6,443,502 B1 | * | 9/2002 | Iida | ........................ | F16L 39/00 |
| | | | | | 285/918 |

(Continued)

*Primary Examiner* — David Bochna
(74) *Attorney, Agent, or Firm* — Quinn IP Law

(57) ABSTRACT

A spigot assembly for connecting a coolant flow conduit to a rechargeable battery thermal management system includes a male spigot, a coolant spigot having a connector body defining an internal coolant flow cavity and having a conduit connection end opening and a male spigot connection end opening. The spigot assembly includes a ceramifiable silicone rubber seal. The connector body is configured to receive the male spigot within the internal coolant flow cavity at the male spigot connection end opening, with the ceramifiable silicone rubber seal disposed between and sealing against an outer side of the male spigot and an inner side of the connector body. A spigot assembly is disclosed that has a collar surrounding the connector body. The collar has an angled inner wall configured to align the male spigot with the connector body and shield the seal from heat. A vehicle having the spigot assembly is disclosed.

20 Claims, 5 Drawing Sheets

(56) References Cited

U.S. PATENT DOCUMENTS

2005/0218606 A1 *  10/2005  Sakazaki ............ F16L 37/0987
                                                    277/627
2022/0243849 A1 *   8/2022  Tembad ............ H01M 10/6556

* cited by examiner

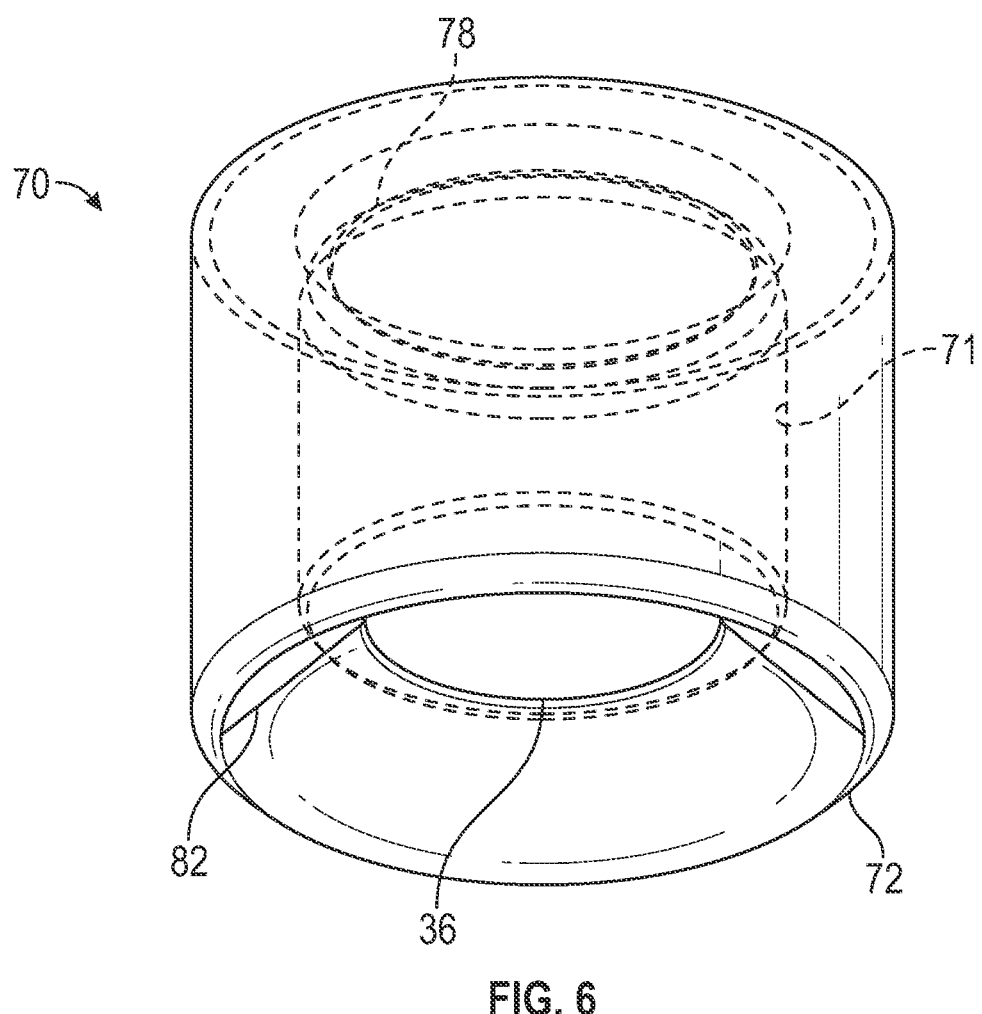
FIG. 6
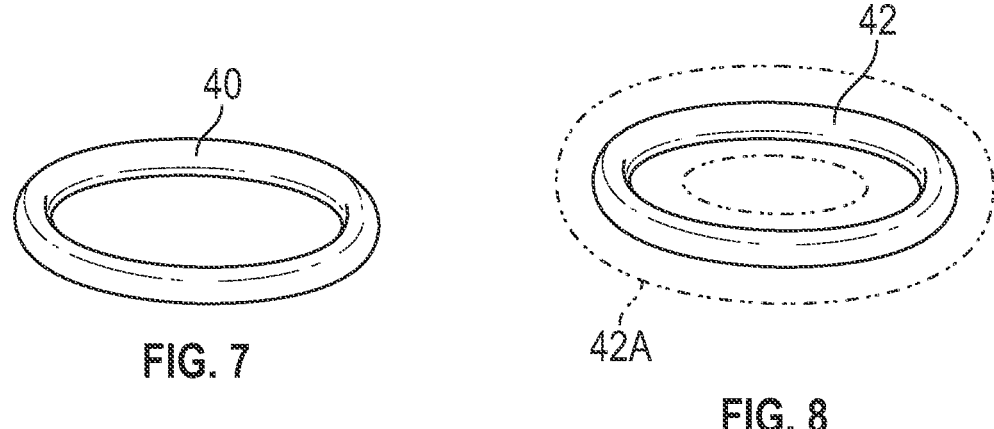
FIG. 7
FIG. 8

SPIGOT ASSEMBLY FOR A RECHARGEABLE BATTERY THERMAL MANAGEMENT SYSTEM AND A VEHICLE HAVING SAME

INTRODUCTION

The present disclosure generally relates to a spigot assembly for a rechargeable battery thermal management system and to a vehicle including the rechargeable battery thermal management system including the spigot assembly.

A rechargeable battery pack may have rechargeable battery cells and other battery components. The individual cells of a battery pack may generate a significant amount of heat during the pack's charge and discharge cycles. Cooling efforts are made to manage the temperature of the battery pack. For example, some rechargeable battery packs are secured to cooling plates through which coolant flows to help cool the adjacent battery pack.

SUMMARY

Disclosed herein are examples of a spigot assembly for use in rechargeable battery pack thermal management systems that enable robust sealing during normal operation and even during a thermal runaway event. The robust sealing prolongs cooling of the rechargeable battery pack during a thermal runaway event. In some examples, the spigot assembly maintains a sealed connection even under extreme temperatures in order to maintain coolant flow, such as to a cooling plate that cools the rechargeable battery pack. Features are provided that enable manufacturing and assembly efficiency as well. Although not limited to use on vehicles, the spigot assemblies disclosed herein are especially beneficial for vehicle use as they include relatively few added components and low added mass.

A spigot assembly for connecting a coolant flow conduit to a rechargeable battery thermal management system may include a male spigot, a connector body that defines an internal coolant flow cavity and has a conduit connection end opening and a male spigot connection end opening, and a ceramifiable silicone rubber seal. The connector body may be configured to receive the male spigot within the internal coolant flow cavity at the male spigot connection end opening with the ceramifiable silicone rubber seal disposed between and sealing against an outer side of the male spigot and an inner side of the connector body. The second seal may include ceramifiable silicone rubber. The ceramifiable silicone rubber material may ceramify and expand when exposed to elevated temperatures, providing a thermal barrier and maintaining the integrity of the sealed connection of the connector body to the male spigot and thus prolonging the ability of coolant flow to enter the cooling plate through the coolant spigot and male spigot.

Examples of ceramifiable silicone rubber that may be implemented include vinyl methyl silicone and fluorosilicone. Rather than melt, these materials expand and ceramify in an oxidation process and but do not harden when at elevated temperatures, thereby maintaining the sealed connection of the coolant spigot and the male spigot.

The ceramifiable silicone rubber seal may include an intumescent additive. The intumescent additive helps to cause the ceramifiable silicone rubber seal to swell when exposed to elevated temperatures. By increasing in size, the ceramifiable silicone rubber seal may further prolong a sealed connection between the coolant spigot and the male spigot to enable cooling of the rechargeable battery pack via the cooling plate. External heat emanating from a direction between the ceramifiable silicone rubber seal and the cooling plate will be at least partially blocked by the enlarged ceramifiable silicone rubber second seal.

In some examples, the spigot assembly may also include an ethylene propylene diene monomer rubber seal disposed between and sealing against the outer side of the male spigot and the inner side of the connector body. The ceramifiable silicone rubber seal may be disposed closer than the ethylene propylene diene monomer rubber seal to the male spigot connection end opening of the connector body and the ethylene propylene diene monomer rubber seal may be disposed closer than the ceramifiable silicone rubber seal to the conduit connection end opening of the connector body. As described herein, the ethylene propylene diene rubber seal may be referred to as a first seal or as an additional seal and the ceramifiable silicone rubber seal may be referred to as a second seal.

The ethylene propylene diene monomer rubber seal is compatible with a liquid ethylene glycol-based coolant. Because the ethylene propylene diene rubber seal is nearer to the conduit entry opening, coolant may contact the ethylene propylene diene rubber seal through an assembly tolerance clearance between the inner side of the connector body and the outer side of the male spigot. Because it is compatible with the coolant, the ethylene propylene diene rubber seal will maintain its sealing function when exposed to the coolant.

In an example, the ethylene propylene diene rubber seal and the ceramifiable silicone rubber seal may be spaced apart from one another within the connector body by a gap extending along a central axis of the coolant flow cavity. The central axis extends from the conduit connection end opening to the male spigot connection end opening. By spacing the seals axially apart from one another to the extent possible according to the size of the connector body, convective or conductive heat transfer to the ethylene propylene diene rubber seal from or past the ceramifiable silicone rubber seal may be lessened in comparison to placing the seals closer to or in contact with one another.

In an implementation, the inner side of the connector body or the outer side of the male spigot may define first and second annular grooves. The ethylene propylene diene rubber seal may be a first O-ring seal nestable in the first annular groove and the ceramifiable silicone rubber seal may be a second O-ring seal nestable in the second annular groove. The annular grooves help to maintain an axial spacing (e.g., the gap along the central axis) between the first and the second O-ring seals even under elevated temperature conditions.

In an example, the connector body of the coolant spigot has a seal housing portion defining the internal coolant flow cavity at the first and second annular grooves and has a support portion defining the internal coolant flow cavity between the seal housing portion and the conduit connection end opening. The connector body may have a stepped internal diameter with a diameter of the internal coolant flow cavity at the support portion and a diameter of the internal coolant flow cavity at the male spigot connection end opening each less than a diameter of the seal housing portion. Spacing the smaller diameter support portion apart from the male spigot connection end with two O-ring seals in between allows a quick and tight connection of the coolant spigot to the male spigot during assembly without additional connection features.

In an example, the connector body of the coolant spigot may be metallic and monolithic (e.g., one continuous single piece of metal). For example, the connector body may be metallic and heat resistant, protecting the spaced O-ring seals. In some examples, the connector body may form the annular grooves. In other examples, the male spigot forms the annular grooves. Additionally, the connector body may form the stepped internal diameter of the support portion and the seal housing portion. The connector body and/or the male spigot may be hydroformed or cold formed, such as by computer numerical control (CNC) machining processes, enabling efficient manufacturing.

In an example, the spigot assembly may include a collar configured to surround the connector body directly outward of the seal(s) and extend axially past the male spigot connection end opening to a collar axial end. By extending past the male spigot connection end opening of the connector body of the coolant spigot, the collar may limit direct heat and particulate impingement from reaching the seal(s) disposed in the connector body. A thickness of the collar also serves to buffer the seal(s) from external heat, providing additional time for the ceramified silicone rubber seal to ceramify and expand.

The collar may have an inner wall that angles outward between the male spigot connection end opening and the collar axial end. The angled inner wall may act as an assembly aid, as the angled inner wall may be configured to align the male spigot with the male spigot connection end opening of the connector body of the coolant spigot during connection of the coolant spigot with the male spigot. The angle of the inner wall may be varied during design to best limit potential heat external to the coolant spigot from being transferred to the seal(s). For example, the angle of the inner wall may be varied depending on a hot gas impingement angle likely in the event of thermal runaway.

In an example, the inner wall may have a frustoconical shape. The frustoconical shape may narrow toward the male spigot connection end opening, for example, thereby functioning as a lead-in for the male spigot. In some examples, the collar may include an intumescent molded plastic. In other examples, the collar may be metallic.

A spigot assembly for connecting a coolant flow conduit to a rechargeable battery thermal management system may include a male spigot and a coolant spigot. The coolant spigot may include a connector body that defines an internal coolant flow cavity and has a conduit connection end opening and a male spigot connection end opening. The spigot assembly may include a seal. The connector body may be configured to receive the male spigot within the internal coolant flow cavity at the male spigot connection end opening, with the seal disposed between and sealing against an outer side of the male spigot and an inner side of the connector body. The spigot assembly may also include a collar configured to surround an outer side of the connector body directly outward of the seal and extend axially past the male spigot connection end opening to a collar axial end. The collar may have an inner wall angling outward between the male spigot connection end opening and the collar axial end. The inner wall may be configured to align the male spigot with the male spigot connection end opening during connection of the coolant spigot with the male spigot.

In an implementation, the collar may be a one-piece component configured to clip to the connector body and self-retain against the outer side of the connector body. For example, the connector body may have an annular outer ledge and an end wall, with the internal grooves disposed axially between the annular outer ledge and the end wall and the male spigot connection end opening extending through the end wall. The collar may have a first internal lip that fits against the annular outer ledge and a second internal lip that fits against the end wall to retain the collar against the outer side of the connector body. The collar may be assembled to the connector body prior to connection of the coolant spigot to the male spigot.

A vehicle disclosed herein may include a rechargeable battery pack and a thermal management system for the rechargeable battery pack. The thermal management system may include a cooling plate defining coolant flow passages and configured to be disposed adjacent to the rechargeable battery pack. The thermal management system may also include a series of coolant flow conduits, a pump configured to circulate coolant through the coolant flow conduits, and a spigot assembly. The spigot assembly may include a male spigot secured to the cooling plate and in fluid communication with the coolant flow passages and a coolant spigot for connecting one of the coolant flow conduits to the male spigot. The coolant spigot may include a connector body defining an internal coolant flow cavity. The coolant spigot may have a conduit connection end opening connectable to the one of the coolant flow conduits and a male spigot connection end opening configured to receive the male spigot. The spigot assembly may also include a first seal and a second seal both disposable within the connector body with the second seal closer to the male spigot connection end opening than the first seal. The first seal and the second seal may be disposed between and seal against an outer side of the male spigot and an inner side of the connector body when the male spigot is received within the internal coolant flow cavity of the connector body at the male spigot connection end opening. The second seal may include ceramifiable silicone rubber and/or the spigot assembly may include a collar configured to surround the connector body directly outward of the first and second seals and extend axially past the male spigot connection end opening to a collar axial end. The collar may have an inner wall angling outward between the male spigot connection end opening and the collar axial end. The inner wall may be configured to align the male spigot with the male spigot connection end opening during connection of the coolant spigot with the male spigot.

In an example vehicle, the male spigot may be an entrance spigot on the cooling plate through which coolant enters into the coolant flow passages of the cooling plate and the coolant spigot may be a first coolant spigot. The thermal management system may include another male spigot that serves as an exit spigot and may also include a second coolant spigot. The exit spigot may be on the cooling plate and coolant may exit the coolant flow passages of the cooling plate through the exit spigot. The second coolant spigot may be connected to another of the coolant flow passages that returns coolant flow to the pump through the second coolant spigot. The second coolant spigot may be configured identically to the first coolant spigot and may be configured to receive the exit spigot.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

The drawings described herein are for illustrative purposes only, are schematic in nature, and are intended to be exemplary rather than to limit the scope of the disclosure.

FIG. 6 is a bottom perspective view of a collar included in the spigot assembly of FIG. 3.

FIG. 7 is a schematic view of a first seal included in the spigot assembly of FIG. 3.

FIG. 8 is a schematic view of a second seal included in the spigot assembly of FIG. 3 and shown in phantom in a heated and expanded state.

DETAILED DESCRIPTION

Figure 1:
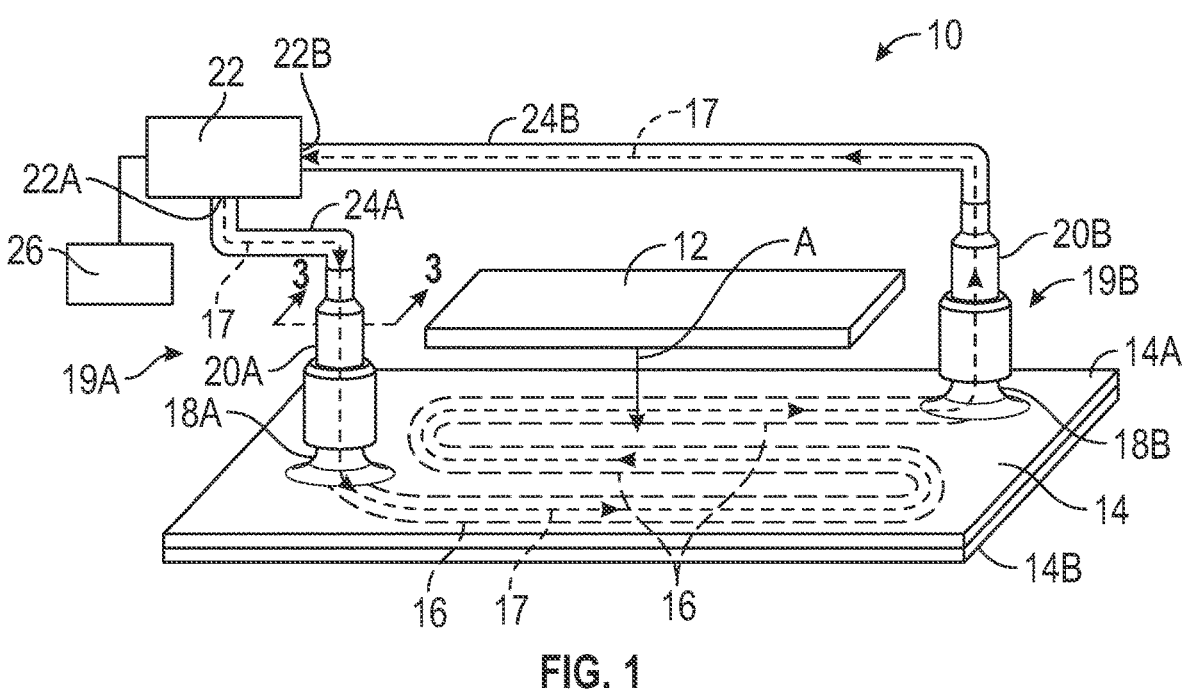
FIG. 1 is a schematic partially exploded view of a rechargeable battery pack and a thermal management system for the rechargeable battery pack.

Referring to the drawings, wherein like reference numbers refer to like components throughout the views, examples of spigot assemblies for use in a thermal managements system of a rechargeable battery pack are shown. The thermal management system is configured to manage the temperature of the rechargeable battery pack during both normal operation and during a more accelerated heat-generating state called "thermal runaway", a condition in which the rechargeable battery pack cannot otherwise return the internal battery components to normal operating temperatures. The spigot assemblies disclosed herein are configured to maintain a sealed connection both during normal operating conditions and in the rare occurrence of a thermal runaway event. Both material selection and component design contribute to the robust sealing ability of the spigot assemblies.

FIG. 1 shows one non-limiting example of a thermal management system 10 and a rechargeable battery pack 12 configured to be disposed adjacent to and cooled by the thermal management system 10. The thermal management system 10 and the rechargeable battery pack 12 may be referred to together as a rechargeable energy storage system. The thermal management system 10 includes a cooling plate 14 that defines coolant flow passages 16. The coolant flow passages 16 are internal passages within the cooling plate 14 and are represented with hidden lines in FIG. 1. The battery pack 12 is shown in partially exploded view and the arrow A depicts its placement on the cooling plate 14 adjacent to the coolant flow passages 16. The cooling plate 14 includes a top sheet 14A and a bottom sheet 14B welded together to enclose the coolant flow passages 16 between the sheets 14A, 14B, for example.

A first spigot assembly 19A includes a first male spigot 18A and a first coolant spigot 20A sealingly connected to the first male spigot 18A. Coolant 17 enters the coolant flow passages 16 through the first spigot assembly 19A and exits the coolant flow passages 16 and the cooling plate 14 through a second spigot assembly 19B. The second spigot assembly 19B includes a second male spigot 18B and a second coolant spigot 20B sealingly connected to the second male spigot 18B. The first male spigot 18A may be referred to as an entrance spigot and the second male spigot 18B may be referred to as an exit spigot. The first and second male spigots 18A, 18B may be identical, and may be welded or otherwise secured to the cooling plate 14 and in fluid communication with the coolant flow passages 16. Although a serpentine-like route of the coolant flow passages 16 from the first male spigot 18A to the second male spigot 18B is shown, the coolant flow passages 16 may have many different configurations. The thermal management system 10 also includes a pump 22 and a series of coolant flow conduits including a coolant flow conduit 24A extending from an outlet 22A of the pump 22 to the first spigot assembly 19A and a coolant flow conduit 24B in fluid communication with the second spigot assembly 19B and an inlet 22B of the pump 22.

The first coolant spigot 20A connects the coolant flow conduit 24A to the first male spigot 18A, and the second coolant spigot 20B connects the coolant flow conduit 24B to the second male spigot 18B. The first spigot assembly 19A may be identical to the second spigot assembly 19B. For example, the first and second coolant spigots 20A and 20B may be identically configured and the first and second male spigots 18A, 18B may be identically configured. Accordingly, description of the features of the first spigot assembly 19A, the first coolant spigot 20A, and the first male spigot 18A herein applies equally to the second spigot assembly 19B, the second coolant spigot 20B, and the second male spigot 18B. The pump 22 is configured to circulate the coolant 17 through the coolant flow conduit 24A, the first coolant spigot 20A, and the first male spigot 18A, into the coolant flow passages 16 in the cooling plate 14, out through the second male spigot 18B and the second coolant spigot 20B, and back through the coolant flow conduit 24B to the pump 22. A controller 26 may be configured to control operation of the pump 22 based on sensed temperature(s) of the battery pack 12 or other operating conditions, for example (sensors not shown).

Although the cooling plate 14 and the battery pack 12 are shown extending horizontally, they may extend in other orientations, such as vertically. In some implementations, such as on a vehicle, there may be multiple battery packs and cooling plates stacked together in various orientations, and coolant flow may be directed through the cooling plates from a common pump or otherwise.

Figure 2:
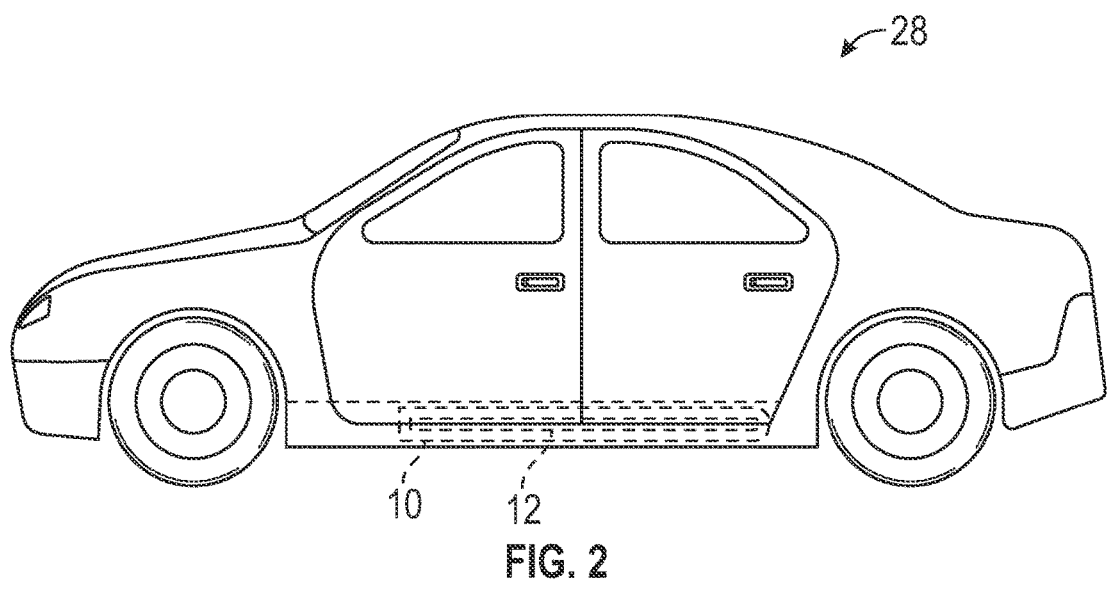
FIG. 2 is a side view of a vehicle that includes the rechargeable battery pack and thermal management system of FIG. 1.

FIG. 2 is an example of a vehicle 28 in which the rechargeable battery pack 12 and the thermal management system 10 may be implemented. The vehicle 28 is shown as an automotive vehicle, and the rechargeable battery pack 12 may be utilized for powering the vehicle 28, such as for providing a motive force. The battery pack 12 and at least portions of the thermal management system 10 are shown schematically in FIG. 2 located below a floor of the vehicle 28 but may instead be disposed elsewhere in the vehicle 28. As used herein, the terms "vehicle" and "motor vehicle" may be used interchangeably and synonymously to include any relevant vehicle platform, such as passenger vehicles (hybrid electric vehicle, fully electric vehicle, fully and partially autonomous, etc.), commercial vehicles, industrial vehicles, tracked vehicles, off-road and all-terrain vehicles, motorcycles, farm equipment, e-scooters, e-bikes, trains, watercraft, aircraft, etc. For non-automotive applications, disclosed concepts may be implemented for other logically relevant uses of a rechargeable battery pack 12 and a thermal management system 10, including laboratories, stand-alone power stations, portable power packs, etc. While not per se limited to such, disclosed concepts may be used with lithium-ion traction battery packs, for example.

Figure 3:
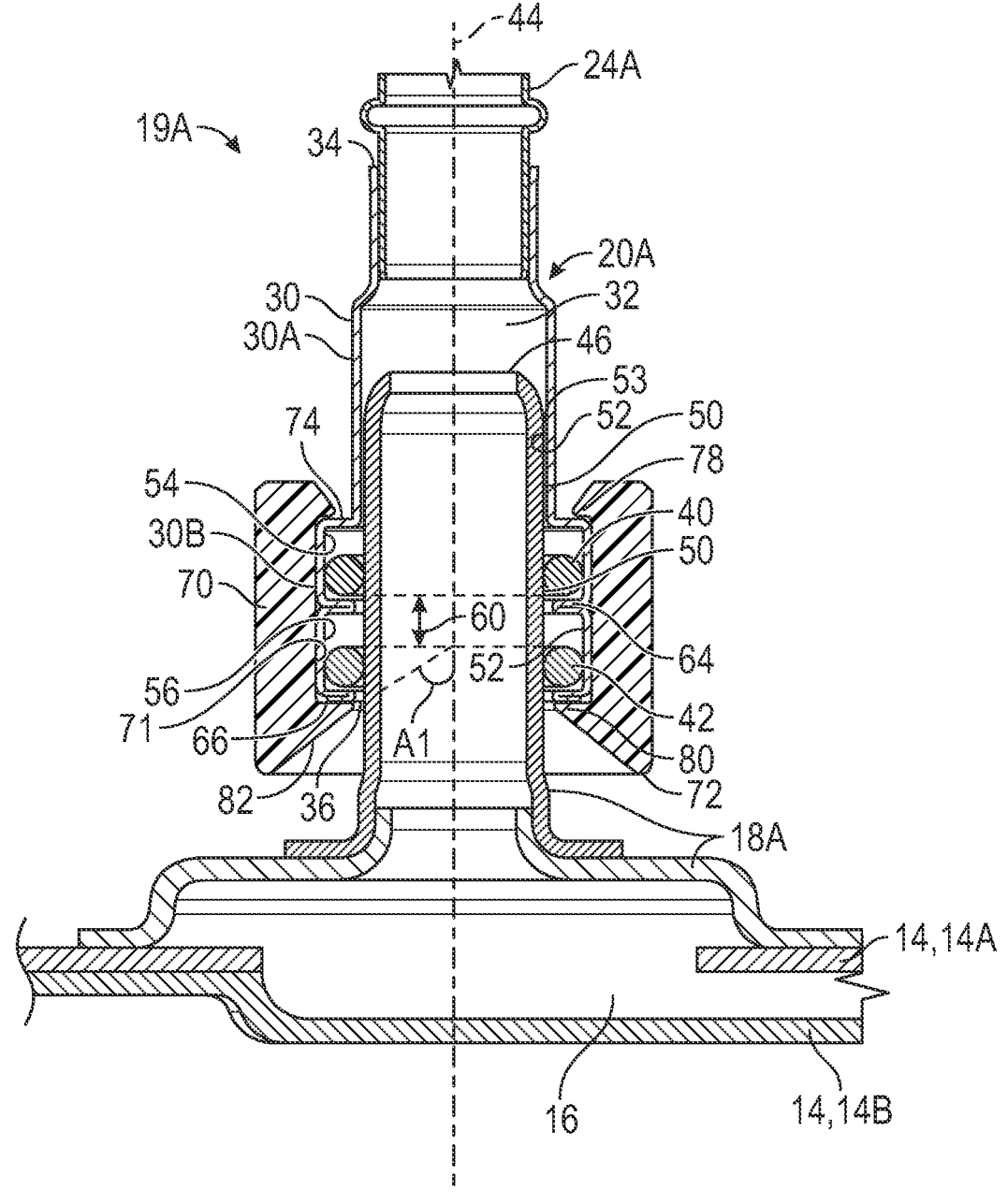
FIG. 3 is a fragmentary cross-sectional view of a spigot assembly, a coolant flow conduit, and a cooling plate of the thermal management system of FIG. 1 taken at lines 3-3 in FIG. 1.

FIG. 3 is a fragmentary cross-sectional view of the first spigot assembly 19A, including the first coolant spigot 20A and the male spigot 18A, and also shows the coolant flow conduit 24A and the cooling plate 14 of FIG. 1. As discussed herein, the spigot assembly 19A utilizes a double O-ring interface of a dual-groove metal connector body 30 of the first coolant spigot 20A with the male spigot 18A (via a first O-ring seal 40 and a second O-ring seal 42), and a heat-shielding collar 70 with an alignment feature to aid in assembly, each of which contributes to the robust sealing ability of the spigot assembly 19A to enable coolant flow to the cooling plate 14 even under elevated temperature conditions exceeding typical operating conditions. Although shown as a double O-ring interface, within the scope of the disclosure, some spigot assemblies may be a single seal assembly, including the second seal 42 discussed herein (i.e., the ceramifiable silicone rubber seal) but not the first seal 40.

The coolant spigot 20A has a connector body 30 that defines an internal coolant flow cavity 32 and has a conduit connection end opening 34 and a male spigot connection end opening 36. As shown in FIG. 3, the coolant flow conduit 24A secures to the connector body 30 at the conduit connection end opening 34 such as by crimping the connector body 30 to the coolant flow conduit 24A or otherwise. As discussed herein, the male spigot 18A is received in the internal coolant flow cavity 32 from the male spigot connection end opening 36 (e.g., a lower end of the connector body 30 in the orientation shown in FIG. 1).

In the example shown, the spigot assembly 19A includes an ethylene propylene diene monomer rubber seal 40 and a ceramifiable silicone rubber seal 42 both disposed within the connector body 30. The ceramifiable silicone rubber seal 42 is disposed closer to the male spigot connection end opening 36 than the ethylene propylene diene monomer rubber seal 40. Stated differently, the ceramifiable silicone rubber seal 42 is disposed further along the central axis 44 of the internal coolant flow cavity 32 of the connector body 30 toward the male spigot connection end opening 36 of the connector body 30 than the ethylene propylene diene monomer rubber seal 40 (i.e., the ceramifiable silicone rubber seal 42 is axially between the ethylene propylene diene monomer rubber seal 40 and the male spigot connection end opening 36 so that the ceramifiable silicone rubber seal 42 is closer to the male spigot connection end opening that the ethylene propylene diene monomer rubber seal 40 and the ethylene propylene diene monomer rubber seal 40 is closer to the conduit connection end opening 34 than the ceramifiable silicone rubber seal 42. The central axis 44 extends at least from the conduit connection end opening 34 to the male spigot connection end opening 36.

The coolant spigot 20A is a unitary component that may be moved in a direction along the central axis 44 (e.g., downward in the orientation shown in FIG. 3) to receive an end 46 of the male spigot 18A within the internal coolant flow cavity 32, with the end 46 finally disposed closer to the conduit connection end opening 34 than the first and second seals 40, 42 when the spigot assembly 19A is fully assembled as shown in FIG. 3. The ethylene propylene diene monomer rubber seal 40 and the ceramifiable silicone rubber seal 42 are disposed between and seal against an outer side 50 of the male spigot 18A and an inner side 52 of the connector body 30 when the coolant spigot 20A is in its final assembled position on the male spigot 18A as shown in FIG. 3. The ethylene propylene diene monomer rubber seal 40 and the ceramifiable silicone rubber seal 42 are both O-ring seals in the examples disclosed herein and may be referred to as such, but other seal geometries may be utilized within the scope of the disclosure. FIG. 7 depicts the ethylene propylene diene monomer rubber seal 40 as an O-ring seal and FIG. 8 depicts the ceramifiable silicone rubber seal 42 as an O-ring seal.

The connector body 30 has a seal housing portion 30B and a support portion 30A. The support portion 30A is referred to as such because it supports the male spigot 18A near end 46 (e.g., prevents excess side-to-side movement of the male spigot 18A). The inner side 52 of the connector body 30 defines a first annular groove 54 and second annular groove 56 at the seal housing portion 30B. The ethylene propylene diene monomer rubber seal 40 is nested in the first annular groove 54 and the ceramifiable silicone rubber seal 42 is nested in the second annular groove 56 prior to assembly of the coolant spigot 20A to the male spigot 18A. The seal housing portion 30B defines the internal coolant flow cavity 32 at the first and second annular grooves 54, 56 and the support portion 30A defines the internal coolant flow cavity 32 between the seal housing portion 30B and the conduit connection end opening 34.

Figure 5:
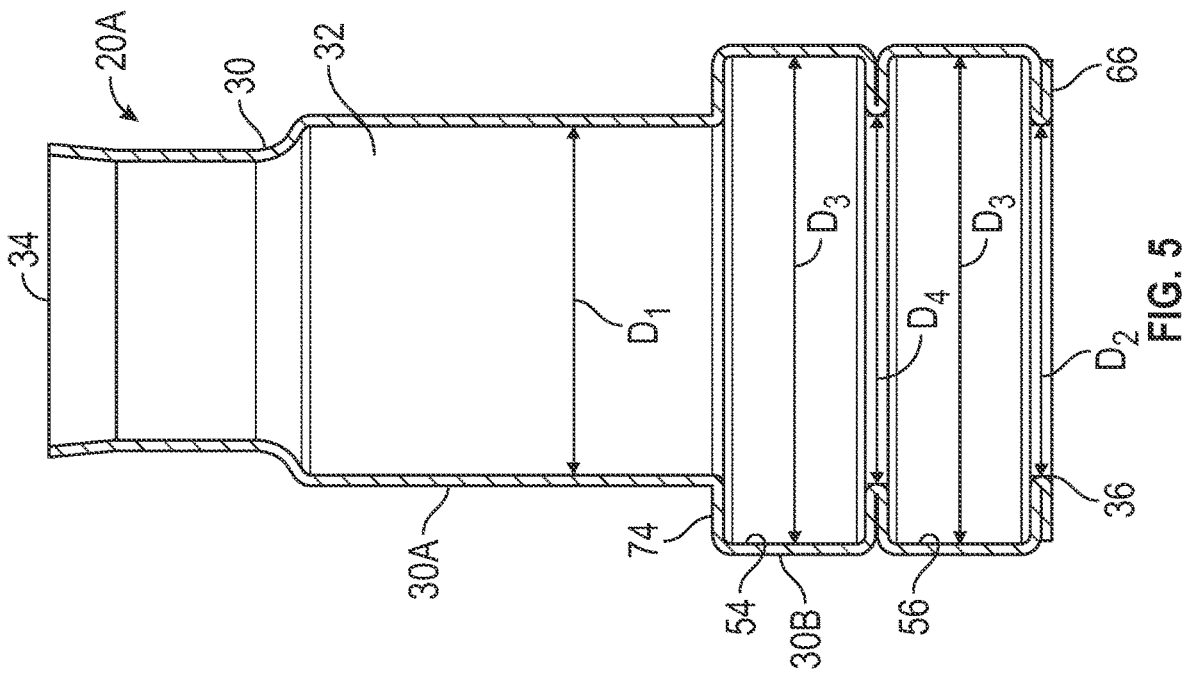
FIG. 5 is a cross-sectional view of a connector body included in the coolant spigot of FIG. 3.

With reference to FIG. 5, the connector body 30 has a stepped internal diameter with a diameter D1 of the internal coolant flow cavity 32 at the support portion 30A, a diameter D2 of the internal coolant flow cavity 32 at the male spigot connection end opening 36, each less than a diameter D3 of the seal housing portion 30B at the annular grooves 54, 56. A diameter D4 of the connector body 30 between the annular grooves 54, 56 is slightly larger than the diameters D1 and D2 and smaller than the diameter D3 of the annular grooves 54, 56 so as not to interfere with either the entry of the male spigot 18A or the sealing interface of the seals 40, 42 with the outer side 50 of the male spigot 18A. This spacing apart of the smaller diameters D1 and D2 with larger diameters D3 and D4 and the two O-ring seals 40, 42 in between better aligns the male spigot 18A with the central axis 44 and allows a quick and tight connection of the coolant spigot 20A to the male spigot 18A without additional connection features.

Figure 4:
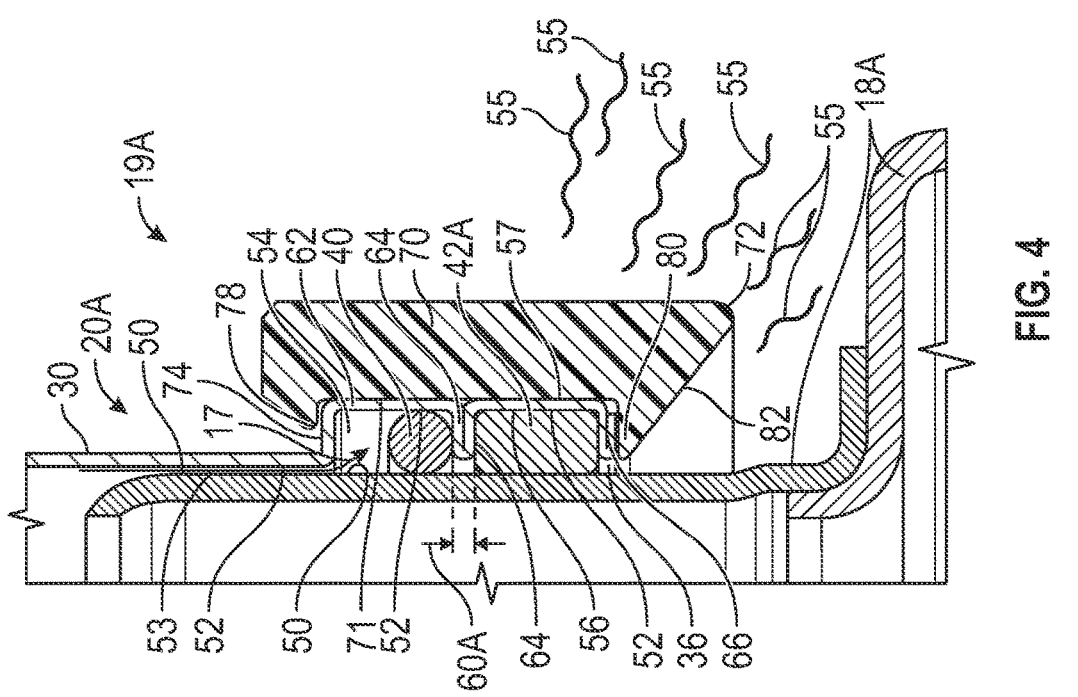
FIG. 4 is a close-up fragmentary cross-sectional view of the spigot assembly, the coolant flow conduit, and the cooling plate of FIG. 3.

Due to the assembly tolerances of the connector body 30 and the male spigot 18A, a clearance 53 exists between the outer side 50 of the male spigot 18A and the inner side 52 of the support portion 30A of the connector body 30 as discussed in FIG. 4. Because of the clearance, some of the coolant 17 flowing through the coolant flow conduit 24A and into the connector body 30 to the male spigot 18A will enter the clearance 53 and the annular groove 54 (see FIG. 4) and come into contact with the ethylene propylene diene monomer rubber seal 40 because the ethylene propylene diene monomer rubber seal 40 is nearer to the conduit connection end opening 34 than the ceramifiable silicone rubber seal 42. The ethylene propylene diene monomer rubber seal 40 is thus configured to be compatible with the coolant 17. For example, the coolant 17 is ethylene-glycol based and the ethylene propylene diene monomer rubber material of the ethylene propylene diene monomer rubber seal 40 is compatible with the liquid ethylene glycol-based coolant. The ethylene propylene diene monomer rubber seal 40 thus maintains its sealing function when exposed to the coolant 17.

The ceramifiable silicone rubber seal 42 is closer to the male spigot connection end opening 36 than the ethylene propylene diene monomer rubber seal 40. In a thermal runaway event, heat may be emanating generally from a direction of the battery pack 12 toward the spigot assembly 19A. For example, with the battery pack 12 resting on the cooling plate 14, heat and particulate impingement (also referred to as heat impingement) may come generally from the right and/or from below the seals 40, 42 in the orientation of FIGS. 3 and 4. This potential area of external elevated heat 55 is represented by wavy lines in FIG. 4. In addition to providing sealing redundancy in examples that include the ethylene propylene diene monomer rubber seal 40, the ceramifiable silicone rubber seal 42 may be more thermal resistant than the ethylene propylene diene monomer rubber seal 40. Materials that are ethylene-glycol coolant compatible, such as ethylene propylene diene monomer rubber seal 40, may have a more limited ability to withstand elevated temperatures than other available materials. As such, the ceramifiable silicone rubber seal 42 may include ceramifiable silicone rubber.

By disposing the ceramifiable silicone rubber seal 42 nearer to the male spigot connection end opening 36, the ceramifiable silicone rubber material may ceramify and expand when exposed to elevated temperatures such as during a thermal runaway event, serving to better secure the coolant spigot 20A to the male spigot 18A and maintain the integrity of the sealed connection of the connector body 30 to the male spigot 18A during the thermal runaway event. In examples that include the ethylene propylene diene monomer rubber seal 40, the expanded ceramifiable silicone rubber seal 42 provides sealing redundancy and prolongs the ability of the ethylene propylene diene monomer rubber seal 40 to maintain a sealed connection so that coolant flow will continue to be directed to the cooling plate 14 through the coolant spigot 20A and male spigot 18A during the thermal runaway event.

Examples of ceramifiable silicone rubber that may be implemented for the ceramifiable silicone rubber seal 42 include vinyl methyl silicone or fluorosilicone. These materials ceramify and expand without hardening under elevated temperatures and withstand elevated temperatures without melting better than other materials such as ethylene propylene diene monomer rubber, thereby maintaining the sealed connection of the coolant spigot 20A and the male spigot 18A.

The ceramifiable silicone rubber seal 42 may also include an intumescent additive. The intumescent additive helps the ceramifiable silicone rubber seal 42 to swell when exposed to elevated temperatures. In FIG. 4, the ceramifiable silicone rubber seal 42 is represented with reference number 42A when in an intumesced state at elevated temperatures, shown substantially filling the second annular groove 56. FIG. 8 also shows the ceramifiable silicone rubber seal 42 in its room temperature state in solid lines and in its intumesced state 42A in phantom lines. The extent to which the ceramifiable silicone rubber seal 42 expands will be dependent upon its original size, the level of heat to which it is exposed, etc., and the ceramifiable silicone rubber seal 42 may not expand as much as shown in the intumesced state 42A in FIG. 4. By increasing in size, the ceramifiable silicone rubber seal 42 may further protect the ethylene propylene diene monomer rubber seal 40 from elevated heat during a thermal runaway event, prolonging the sealed connection between the coolant spigot 20A and the male spigot 18A to enable cooling of the rechargeable battery pack 12 via the cooling plate 14. External elevated heat 55 emanating from a direction between the ceramifiable silicone rubber seal 42 and the cooling plate 14 will be at least partially blocked from affecting the ethylene propylene diene monomer rubber seal 40 by the enlarged ceramifiable silicone rubber seal 42 (shown as 42A in the enlarged state).

Additionally, the annular grooves 54, 56 maintain an axial spacing between the O-ring seals 40, 42 during normal operating conditions and even under elevated temperature conditions as discussed herein. As shown in FIG. 3, under normal operating conditions, the ethylene propylene diene monomer rubber seal 40 and the ceramifiable silicone rubber seal 42 are spaced apart from one another within the connector body 30 by a gap 60 extending along the central axis 44. By spacing the seals 40, 42 axially apart from one another to the extent possible according to the size of the connector body 30, the ceramifiable silicone rubber seal 42 can act as a thermal barrier with minimal convection or conduction heat transfer transmitted past the ceramifiable silicone rubber seal 42 to the first seal 40. FIG. 4 illustrates a reduction in the size of the gap 60 to gap 60A due to the intumescence of the ceramifiable silicone rubber seal 42 to the intumesced state 42A under elevated temperature conditions such as a thermal runaway event. Even in the intumesced state 42A, a gap 60A is present.

The connector body 30 may be metallic and heat resistant, protecting the seals 40, 42. As shown, the connector body 30 is monolithic. Stated differently, the connector body 30 is a one-piece component. The connector body 30 forms the annular grooves 54, 56 as well as the stepped internal diameters of the support portion 30A and the seal housing portion 30B. As best shown in FIG. 4, the side wall 62 of the connector body 30 is folded over on itself to form a ledge 64 of double wall thickness on which the ethylene propylene diene monomer rubber seal 40 sits. The double wall thickness helps shield heat from the ethylene propylene diene monomer rubber seal 40. Additionally, the connector body 30 is folded over on itself to define an end wall 66 that defines the male spigot connection end opening 36 and that serves as a ledge on which the ceramifiable silicone rubber seal 42 sits. The double wall thickness of the end wall 66 also serves as a heat barrier. The connector body 30 may be hydroformed or cold formed, such as by computer numerical control (CNC) machining processes to achieve the monolithic geometry as described, enabling efficient manufacturing. Alternatively, the connector body 30 could be cast to form the annular grooves 54, 56.

In addition to the connector body 30, the coolant spigot 20A includes a collar 70 that provides additional heat protection as well as aids in alignment of the internal coolant flow cavity 32 with the male spigot 18A during assembly. The collar 70 has an internal cylindrical cavity 71 that is sized to fit around the seal housing portion 30B. The collar 70 is configured to surround the connector body 30 directly outward of the seals 40, 42 and extend axially past the male spigot connection end opening 36 to a collar axial end 72. The collar 70 is thus disposed transversely (e.g., radially) outward of the axial location of the seals 40, 42 and the seal housing portion 30B along the central axis 44. By extending past the male spigot connection end opening 36 to the collar axial end 72 (e.g., further downward in the orientation of FIGS. 3 and 4), the collar 70 may limit heat and particulate impingement from reaching the seals 40, 42 in the connector body 30. The thickness of the collar 70 buffers the seals 40, 42 from external heat in order to provide additional time for the ceramifiable silicone rubber seal 42 to expand. In some examples, the collar 70 may be metallic, like the connector body 30. In other implementations, the collar 70 may include an intumescent molded plastic, such as an intumescent molded thermoplastic as may be available from PYRO-PHOBIC SYSTEMS LTD.® of Barrie, Ontario Canada.

As shown in FIG. 3, the collar 70 is a one-piece component configured to clip to the connector body 30 and self-retain against the outer side 57 of the connector body 30 at the seal housing portion 30B. The connector body 30 has an annular outer ledge 74 and the end wall 66 at the opposite axial extents of the seal housing portion 30B. The annular grooves 54, 56 are disposed axially between the annular outer ledge 74 and the end wall 66. The male spigot connection end opening 36 extends through the end wall 66. The collar 70 has a first internal lip 78 that fits against the annular outer ledge 74 and a second internal lip 80 that fits against the end wall 66. The collar 70 may be assembled to the connector body 30 prior to connection of the coolant spigot 20A to the male spigot 18A. For example, the collar 70 may be a somewhat flexible material so that it can clip onto the seal housing portion 30B with the internal lips 78, 80 fitting against the respective annular outer ledge 74 and end wall 66 to retain the collar 70 against the outer side 57 of the connector body 30.

The collar 70 may also serve as an alignment feature for the male spigot 18A. The collar 70 has an inner wall 82 that angles outward (e.g., away from the central axis 44) between the male spigot connection end opening 36 and the collar axial end 72. The angled wall 82 is also depicted in the bottom perspective view of the collar 70 in FIG. 6. The angled inner wall 82 acts as an assembly aid, as the end 46 of the male spigot 18A slides along the angled inner wall 82 during insertion to be guided inward toward the male spigot connection end opening 36 and past the seals 40, 42 to the support portion 30A. The angled inner wall 82 thus aligns the male spigot 18A with the male spigot connection end opening 36 during connection of the coolant spigot 20A with the male spigot 18A.

The angle A1 of the inner wall 82 relative to the central axis 44 (indicated in FIG. 3) may be designed to best limit heat external to the spigot assembly 19A from being transferred to the seals 40, 42. For example, if heat impingement is expected from a direction below the collar axial end 72, a relatively small angle A1 (e.g., nearer to vertical in the orientation shown in FIG. 3) may be utilized.

The inner wall 82 may have a frustoconical shape. In the orientation shown, the inner wall 82 has an inverted frustoconical shape. The frustoconical shape narrows from the collar axial end 72 toward the internal lip 80 at the male spigot connection end opening 36, thereby functioning as a lead in for the male spigot 18A.

Figure 9:
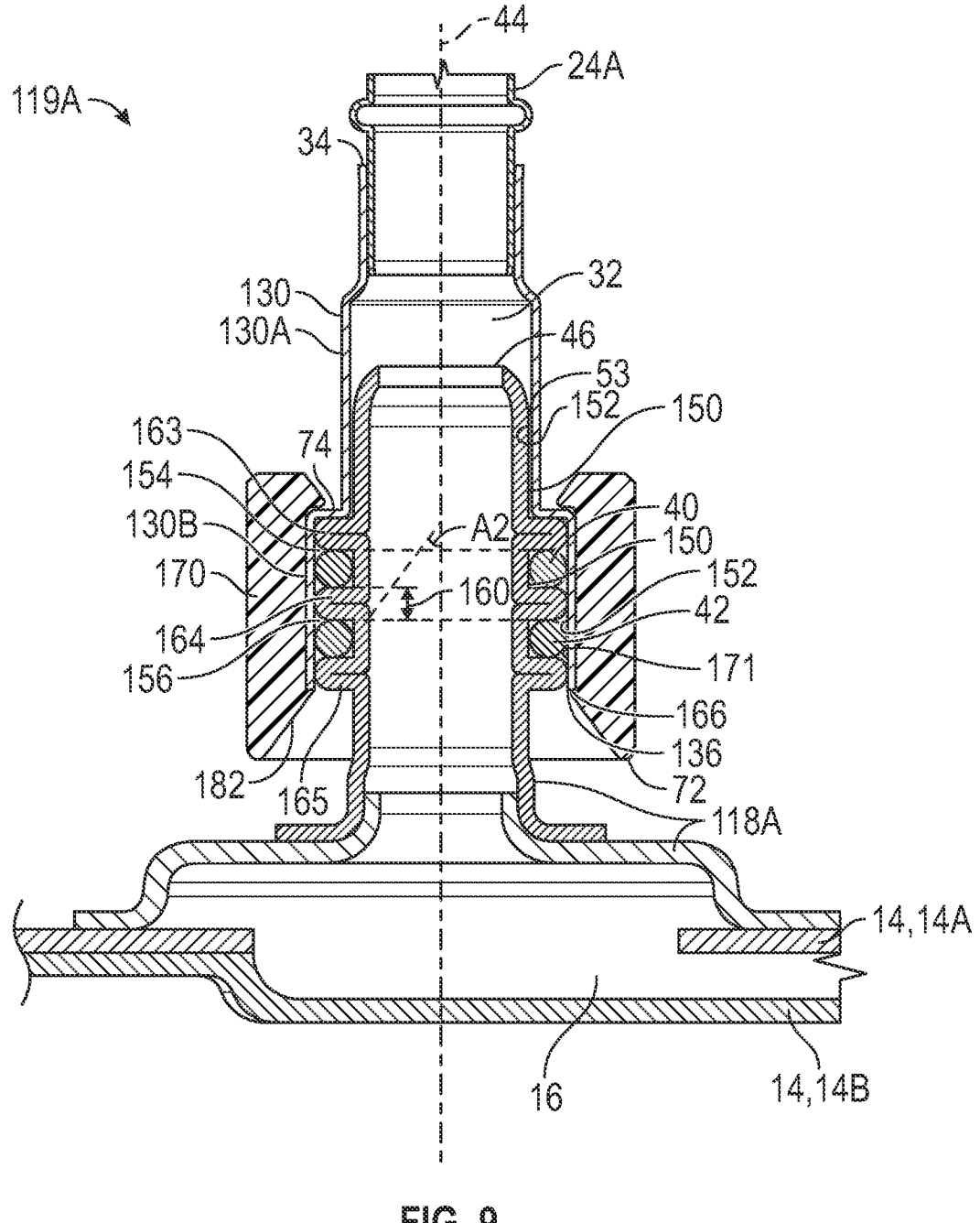
FIG. 9 is a fragmentary cross-sectional view of another example of a spigot assembly connecting the coolant flow conduit and the cooling plate of the thermal management system of FIG. 1.

FIG. 9 shows an alternative example of another spigot assembly 119A used in place of spigot assembly 19A and connecting the coolant flow conduit 24A and the cooling plate 14 of the thermal management system 10 of FIG. 1. The spigot assembly 119A has many of the same components, functions, and features as the spigot assembly 19A. Components and features that are identical are indicated with identical reference numbers.

The spigot assembly 119A includes a male spigot 118A configured similarly to the male spigot 18A except that the male spigot 118A forms first and second external annular grooves 154, 156. The male spigot 118A may be machined to form the annular grooves 154, 156 at an outer side 150. For example, the wall of the male spigot 118A is shown folded over on itself to form a ledge 163 of double wall thickness, a ledge 164 of double wall thickness, and a ledge 165 of double wall thickness. The annular groove 154 is defined between the ledges 163, 164, and the ethylene propylene diene monomer rubber seal 40 nests in the annular groove 154 and sits on the ledge 164. The annular groove 156 is defined between the ledges 164, 165 and the ceramifiable silicone rubber seal 40 nests in the annular groove 156 and sits on the ledge 165. As shown in FIG. 9, under normal operating conditions, the ethylene propylene diene monomer rubber seal 40 and the ceramifiable silicone rubber seal 42 are spaced apart from one another by the male spigot 118A within the connector body 130 by a gap 160 extending along the central axis 44. By spacing the seals 40, 42 axially apart from one another to the extent possible according to the size of the connector body 130, the ceramifiable silicone rubber seal 42 can act as a thermal barrier with minimal convection or conduction heat transfer transmitted past the ceramifiable silicone rubber seal 42 to the first seal 40. The gap 160 may be the same size as the gap 60 in FIG. 3, or a different size, as the drawings are not necessarily to scale. During a thermal runaway event, the ceramifiable silicone rubber seal 42 will expand as previously discussed. The double wall thickness of the ledges 163, 164, and 165 also serves as a heat barrier. The male spigot 118A may be hydroformed or cold formed, such as by computer numerical control (CNC) machining processes to achieve the monolithic geometry as described, enabling efficient manufacturing. Alternatively, the male spigot 118A could be cast to form the annular grooves 154, 156.

Because the annular grooves 154, 156 are in the male spigot 118A, the spigot assembly 119A includes a coolant spigot 120A that is different from coolant spigot 20A. For example, the coolant spigot 120A includes a connector body 130 that does not form internal annular grooves. The connector body 130 includes a support portion 130A that may be identical to support portion 30A. The connector body 130 includes a seal housing portion 130B without the ledge 64, end wall 66, and annular grooves 54, 56 of the seal housing portion 30B. The seal housing portion 130B may be of a uniform internal diameter that is larger than the outer diameter of the ledges 173, 164, and 165 and extends to an end 166 that defines a male spigot connection end opening 136 of the same diameter as the rest of the seal housing portion 130B. This allows the male spigot 118A to be received at the male spigot connection end opening 136 and slide within the internal coolant flow cavity 32 so that the end 46 is supported within the support portion 130A and the seals 40, 42 are disposed between and sealed against the inner side 152 of the connector body 130 (at the seal housing portion 130B) and the outer side 150 of the male spigot 118A.

The spigot assembly 1119A includes a heat-shielding collar 170 like the collar 70 with an internal cylindrical cavity 171 that is sized to fit around the seal housing portion 130B to surround the connector body 130 directly outward of the seals 40, 42 and extend axially past the male spigot connection end opening 136 to a collar axial end 72.

The collar 170 includes the angled inner wall 182 serving as an alignment feature for the male spigot 118A. The angled inner wall 182 is configured as described with respect to the angled inner wall 82 of the collar 70 and angles outward between the male spigot connection end opening 136 and the collar axial end 72 (e.g., from the male spigot connection end opening 136 to the collar axial end 72). The angled inner wall 182 is shown closer to vertical than the angled inner wall 82 of the collar 70 so that angle A2 of the inner wall 182 relative to the central axis 44 is a lower numerical value than angle A1.

The angled inner wall 182 acts as an assembly aid, as the end 46 of the male spigot 118A slides along the angled inner wall 182 during insertion to be guided toward the male spigot connection end opening 136 and past the seals 40, 42 to the support portion 130A. The inner wall 182 has a frustoconical shape. The collar 170 extends no further inward than the inner side 152 of the connector body 130 at the male spigot connection end opening 36 so as not to interfere with the ledges 163, 164, and 165 during assembly of the connector body 130 over the male spigot 118A.

Accordingly, the spigot assemblies 19A and 119A disclosed herein enable robust sealing for coolant flow integrity during normal operation and during a thermal runaway event. The spigot assemblies 19A and 119A utilize material selection and placement, as well as other features to provide thermal protection as well as manufacturing efficiency with minimal weight addition.

While the best modes for carrying out the disclosure have been described in detail, those familiar with the art to which this disclosure relates will recognize various alternative designs and examples for practicing the disclosure within the scope of the appended claims.

What is claimed is:

1. A spigot assembly for connecting a coolant flow conduit to a rechargeable battery thermal management system, the spigot assembly comprising:

a male spigot;

a coolant spigot having a connector body that defines an internal coolant flow cavity and has a conduit connection end opening and a male spigot connection end opening;

an ethylene propylene diene monomer rubber seal; and a ceramifiable silicone rubber seal configured to ceramify and expand when exposed to elevated temperatures to thereby maintain a sealed connection between the connector body and the male spigot during a thermal runaway event of a rechargeable battery pack;

wherein the connector body is configured to receive the male spigot within the internal coolant flow cavity at the male spigot connection end opening, with the ethylene propylene diene monomer rubber seal and the ceramifiable silicone rubber seal disposed between and sealing against an outer side of the male spigot and an inner side of the connector body.

2. The spigot assembly of claim 1, wherein the ceramifiable silicone rubber seal comprises vinyl methyl silicone or flourosilicone; and/or wherein the ceramifiable silicone rubber seal includes an intumescent additive.

3. The spigot assembly of claim 1, wherein the ceramifiable silicone rubber seal is disposed closer to the male spigot connection end opening of the connector body than the ethylene propylene diene monomer rubber seal and the ethylene propylene diene monomer rubber seal is disposed closer to the conduit connection end opening of the connector body than the ceramifiable silicone rubber seal.

4. The spigot assembly of claim 3, wherein the internal coolant flow cavity defines a central axis extending from the conduit connection end opening to the male spigot connection end opening, and the ethylene propylene diene monomer rubber seal and the ceramifiable silicone rubber seal are spaced apart from one another within the connector body by a gap extending along the central axis.

5. The spigot assembly of claim 4, wherein:

the inner side of the connector body or the outer side of the male spigot defines first and second annular grooves; and wherein the ethylene propylene diene monomer rubber seal is an O-ring seal nestable in the first annular groove and the ceramifiable silicone rubber seal is a second O-ring seal nestable in the second annular groove.

6. The spigot assembly of claim 5, wherein the connector body has a seal housing portion defining the internal coolant flow cavity at the first and second annular grooves and has a support portion defining the internal coolant flow cavity between the seal housing portion and the conduit connection end opening; and wherein the connector body has a stepped internal diameter with a diameter of the internal coolant flow cavity at the support portion and a diameter of the internal coolant flow cavity at the male spigot connection end opening each less than a diameter of the internal coolant flow cavity at the seal housing portion.

7. The spigot assembly of claim 1, further comprising:

a collar having a collar axial end and configured to surround the connector body directly outward of the ceramifiable silicone rubber seal and extend axially past the male spigot connection end opening to the collar axial end.

8. The spigot assembly of claim 7, wherein the collar has an inner wall angling outward between the male spigot connection end opening and the collar axial end, the inner wall configured to align the male spigot with the male spigot connection end opening during connection of the coolant spigot with the male spigot.

9. The spigot assembly of claim 8, wherein the inner wall has a frustoconical shape.

10. The spigot assembly of claim 9, wherein the connector body is metallic and monolithic and the collar comprises an intumescent molded plastic.

11. A spigot assembly for connecting a coolant flow conduit to a cooling plate of a rechargeable battery pack in a rechargeable battery thermal management system, the spigot assembly comprising:

a male spigot;

a coolant spigot having a connector body that defines an internal coolant flow cavity and has a conduit connection end opening and a male spigot connection end opening;

a seal comprising a ceramifiable silicone rubber, wherein the seal is configured to ceramify and expand when exposed to elevated temperatures to thereby maintain a sealed connection between the connector body and the male spigot during a thermal runaway event of the rechargeable battery pack;

an additional seal comprising ethylene propylene diene monomer rubber, wherein the additional seal is disposed against the outer side of the male spigot and the inner side of the connector body;

wherein the connector body is configured to receive the male spigot within the internal coolant flow cavity at the male spigot connection end opening with the seal disposed between and sealing against an outer side of the male spigot and an inner side of the connector body; and a collar having a collar axial end and configured to surround an outer side of the connector body directly outward of the seal and extend axially past the male spigot connection end opening to the collar axial end;

wherein the collar has an inner wall angling outward between the male spigot connection end opening and the collar axial end, the inner wall configured to align the male spigot with the male spigot connection end opening during connection of the coolant spigot with the male spigot.

12. The spigot assembly of claim 11, wherein the inner wall has a frustoconical shape.

13. The spigot assembly of claim 11, wherein the collar comprises an intumescent molded plastic.

14. The spigot assembly of claim 11, wherein the collar is a one-piece component configured to clip to the connector body and self-retain against the outer side of the connector body.

15. The spigot assembly of claim 14, wherein the connector body comprises an annular outer ledge and an end wall, the seal is disposed axially between the annular outer ledge and the end wall, and the male spigot connection end opening extends through the end wall; and wherein the collar has a first internal lip that fits against the annular outer ledge and a second internal lip that fits against the end wall to retain the collar against the outer side of the connector body.

16. The spigot assembly of claim 11, wherein the connector body has a seal housing portion defining the internal coolant flow cavity at the seal and has a support portion defining the internal coolant flow cavity between the seal housing portion and the conduit connection end opening; and wherein the connector body has a stepped internal diameter with a diameter of the internal coolant flow cavity at the support portion and a diameter of the internal coolant flow cavity at the male spigot connection end opening each less than a diameter of the internal coolant flow cavity at the seal housing portion.

17. The spigot assembly of claim 11, wherein the seal comprising ceramifiable silicone rubber is disposed closer to the male spigot connection end opening of the connector body than the additional seal comprising ethylene propylene diene monomer rubber and the additional seal comprising ethylene propylene diene monomer rubber is disposed closer to the conduit connection end opening of the connector body than the seal comprising ceramifiable silicone rubber.

18. A vehicle comprising:

a rechargeable battery pack; and a thermal management system for the rechargeable battery pack, the thermal management system comprising:

a cooling plate defining coolant flow passages and configured to be disposed adjacent to the rechargeable battery pack;

a male spigot securable to the cooling plate and in fluid communication with the coolant flow passages;

a series of coolant flow conduits;

a pump configured to circulate coolant through the coolant flow conduits; and a coolant spigot for connecting one of the coolant flow conduits to the male spigot, the coolant spigot comprising:

a connector body that defines an internal coolant flow cavity and has a conduit connection end opening connectable to the one of the coolant flow conduits and a male spigot connection end opening configured to receive the male spigot;

a first seal comprising ethylene propylene diene monomer rubber; and a second seal comprising ceramifiable silicone rubber configured to ceramify and expand when exposed to elevated temperatures to thereby maintain a sealed connection between the connector body and the male spigot during a thermal runaway event of the rechargeable battery pack;

wherein the first seal and the second seal are disposed between and seal against an outer side of the male spigot and an inner side of the connector body with the second seal closer to the male spigot connection end opening of the connector body than the first seal when the male spigot is received within the internal coolant flow cavity of the connector body at the male spigot connection end opening;

wherein the coolant spigot includes a collar, the collar having a collar axial end and configured to surround the connector body directly outward of the first and second seals and extend axially past the male spigot connection end opening to the collar axial end, and the collar having an inner wall angling outward between the male spigot connection end opening and the collar axial end, the inner wall configured to align the male spigot with the male spigot connection end opening during connection of the coolant spigot with the male spigot; and wherein both the ethylene propylene diene monomer rubber seal and the ceramifiable silicone rubber seal are disposed between and seal against an outer side of the male spigot and an inner side of the connector body.

19. The vehicle of claim 18, wherein the male spigot is an entrance spigot on the cooling plate through which coolant enters into the coolant flow passages of the cooling plate, the coolant spigot is a first coolant spigot, and the thermal management system further comprising:

an exit spigot on the cooling plate through which coolant exits the coolant flow passages of the cooling plate; and a second coolant spigot connectable to another of the coolant flow passages that returns coolant flow to the pump, the second coolant spigot configured identically to the first coolant spigot;

wherein the second coolant spigot is configured to receive the exit spigot.

20. The vehicle of claim 18, wherein the connector body has a seal housing portion defining the internal coolant flow cavity at the first and second seals and has a support portion defining the internal coolant flow cavity between the seal housing portion and the conduit connection end opening; and wherein the connector body has a stepped internal diameter with a diameter of the internal coolant flow cavity at the support portion and a diameter of the internal coolant flow cavity at the male spigot connection end opening each less than a diameter of the seal housing portion.

\* \* \* \* \*